Sept. 30, 1969  M. L. HEILIG  3,469,837
EXPERIENCE THEATER
Filed May 9, 1966  13 Sheets-Sheet 1

INVENTOR.
MORTON L. HEILIG
BY
Hopgood & Calimafde
ATTORNEYS.

INVENTOR.
MORTON L. HEILIG

Sept. 30, 1969 M. L. HEILIG 3,469,837
EXPERIENCE THEATER
Filed May 9, 1966 13 Sheets-Sheet 3

INVENTOR.
MORTON L. HEILIG
BY
Hopgood & Calimafde
ATTORNEYS.

INVENTOR.
MORTON L. HEILIG
BY
Hopgood & Calimafde
ATTORNEYS.

Sept. 30, 1969  M. L. HEILIG  3,469,837
EXPERIENCE THEATER

Filed May 9, 1966  13 Sheets-Sheet 6

INVENTOR.
MORTON L. HEILIG
BY
Hopgood & Calimafde
ATTORNEYS.

Sept. 30, 1969 M. L. HEILIG 3,469,837
EXPERIENCE THEATER
Filed May 9, 1966 13 Sheets-Sheet 7

INVENTOR.
MORTON L. HEILIG
BY
Hopgood & Calimafde
ATTORNEYS.

Sept. 30, 1969            M. L. HEILIG            3,469,837

EXPERIENCE THEATER

Filed May 9, 1966            13 Sheets-Sheet 10

INVENTOR.
MORTON L. HEILIG

BY
*Hopgood & Calimafde*
ATTORNEYS.

INVENTOR.
MORTON L. HEILIG

United States Patent Office 3,469,837
Patented Sept. 30, 1969

3,469,837
EXPERIENCE THEATER
Morton L. Heilig, 60 Riverside Drive,
New York, N.Y. 10024
Filed Mar. 9, 1966, Ser. No. 533,017
Int. Cl. A63j *5/00;* G03b *31/00, 21/56*
U.S. Cl. 272—8          10 Claims

ABSTRACT OF THE DISCLOSURE

An experience theater is provided comprising a projection screen of concave configuration of substantially hemispherical sweep embracing substantially the entire normal field of vision of a spectator viewing the screen horizontally from a seated position, a projection system capable of wide angle projection located substantially centrally of the concave screen, a plurality of loudspeakers located within said theater to provide sound effects, and a plurality of viewing chairs whose plane of support is steeply inclined to an imaginary plane extending vertically downward from the ceiling of said theater, the plane of support of said chairs subtending in the vertical direction the substantially hemispherical sweep of said concave screen.

---

This invention relates to the art of motion picture or television and the enjoyment thereof. More particularly, the invention relates to an improved form of motion picture or television entertainment in which the spectator is enabled, through substantially all of his senses, to experience realistically the full effect or illusion of being a part of or physically responding to the environment depicted by the motion picture. For the sake of brevity, the invention is referred to herein as the experience theater and is meant to include any form of animation whether produced by the passage of light through a moving motion picture film or produced electronically as, for example, by the technique commonly employed in television, magnetic tape recording, or even the relatively new techniques of hollography or laser beam projection.

Thus, insofar as the invention is concerned, the experience theater is a new and improved type of theater designed to completely involve a mass audience into a new and exciting world of experience.

All other existing theater systems, even the most advanced, such as Cinerama and Circarama, feed only parts of man's sensory apparatus with information. Thus, the spectator viewing a film or television program in these theaters is constantly reminded that he is not really in the world being depicted on the screen, but rather in a theater looking at an image of it on the screen.

By feeding almost all of man's sensory apparatus with information from the scenes or programs rather than the theater, the experience theater makes the spectator in the audience feel that he has been physically transported into and made part of the scene itself.

Accordingly, it is the object of the invention to provide an experience theater system which gives to an observer or spectator a desired realistic experience by utilizing sensing elements and conditions which enable the spectator to respond fully to the illusion of being part of the created environment and thus receive the full dramatic impact portrayed by the scene.

Another object is to provide a new and improved viewing screen having a concave configuration adapted to full peripheral viewing, the screen being formed of a mosaic of reflective elements.

A still further object is to provide the combination of viewing chairs and associated sense-stimulating elements together with a concave viewing screen adapted for full peripheral viewing.

Still another object is to provide a viewing chair having associated sense-stimulating means including mechanical articulating means for applying controlled movement to the chair to promote awareness of body position conforming to body attitude portrayed by a particular motion picture scene.

These and other objects will more clearly appear when taken in conjunction with the following disclosure and the accompanying drawings, wherein.

As one preferred embodiment of the experience theater, the invention provides a projection screen of concave configuration of substantially hemispherical sweep which embraces substantially the entire normal field of vision of a spectator, in combination with a centrally located projection system, a plurality of loudspeakers spaced in predetermined positions on the convex side of the screen, a plurality of specially arranged viewing chairs, with the plane of support of the chairs steeply inclined to the ceiling of the theater such that the plane of support subtends the concave screen much as a chord subtends an arc of a circle, and sense-stimulating means associated with each of the chairs.

The sense-stimulating means are employed in a manner to simulate the natural range of man's major senses, to-wit: (1) vision which involves moving colored imagery which may be depicted in 3 dimensions and which may have a horizontal angle of 185° and a vertical angle of 150°; (2) hearing involving dimensional sound that comes from all points around the head; smell based on aromas and taste; (4) tactile sensations of heat and/or cold with pressure; and (5) kinesthetic sensations involving awareness of body position.

The experience theater utilizes sense-stimulating means to feed sensory information to approximately 95% of this system, in the following manner: (a) a hemispherical or marshmallow or obloidal shaped screen to reflect moving, colored images with 3-dimensional effect that fills 170° of the spectator's horizontal vision and 125° of his vertical vision; (b) the use of 5 to 30 speakers to provide directional sound from all points in the screen and one small speaker in each chair provides sound from behind the spectator's head; (c) the feeding of aromas through the arm of each chair with immediate evacuation through the hooded space above the spectator's head; these aromas can be changed instantly according to the needs of the film; (d) the application of tactile sensations by blowers that blow air of controlled and varying temperatures to the head and hands of the spectator and the use of a vibrating oscillator in each chair which conveys the appropriate vibrations (motorcycle, train, automobile, etc.) to the entire body of the spectator; (e) and the simulation of body attitude by tilting the spectator's chair to various angles as might occur in a banking airplane or a speedboat.

The advantages of the invention are achieved by utilizing the foregoing effects or sensations in combination. If any of the above sensations are provided alone, the psychological effect is completely unnatural and therefore ineffective and unsatisfying. But when provided together in a properly programmed manner, the effect is completely natural, therefore very convincing and enjoyable.

For example, 3-dimensional imagery is not satisfactory without substantially full use of peripheral vision, and aromas are unnatural unless objects are portrayed with a 3-dimensional effect, etc. The natural and necessary unity of all these sensory stimuli is the key idea of the experience theater, but the invention goes much further in that it solves the many problems that immediately arise when the traditional means of supplying one sensation conflict with these necessary to provide another; and when it is desired to provide these multiple stimuli to a mass audience rather than to one individual.

In this connection, the shape of the concave screen is very important, several embodiments of which are shown in FIGS. 1 to 4. In order to take full advantage of the peripheral field of vision made possible by the screen, the viewing chairs are supported on a plane "P" steeply inclined to an imaginery plane "V" extending vertically downward from the ceiling "C." As will be noted, the plane of support of the chairs subtends the concave screen "S." In effect, the audience is closed in by the screen itself, with the concave portion facing the audience, the plane of support of the chairs making, for example, an angle of about 65° with the floor of the theater.

Figure 1:
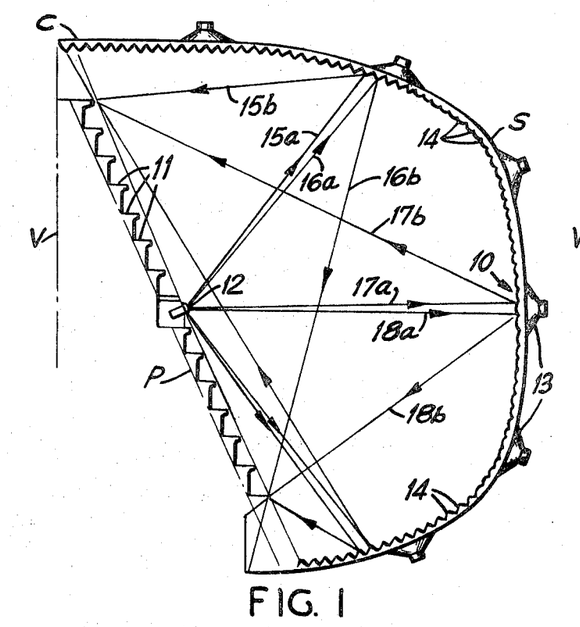
FIGS. 1 and 2 are illustrative of one embodiment of a concave viewing screen provided by the invention.
Figure 2:
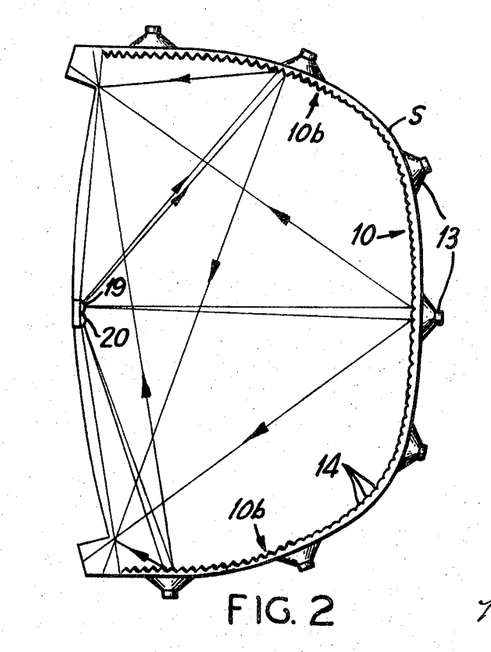
Figure 3:
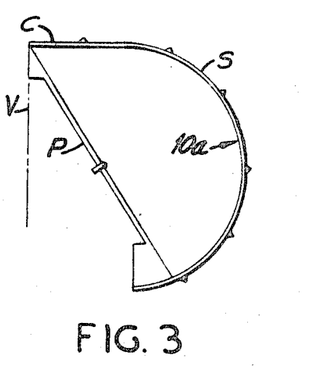
FIGS. 3 and 4 depict another embodiment of a concave viewing screen which may be employed in carrying out the invention.
Figure 4:
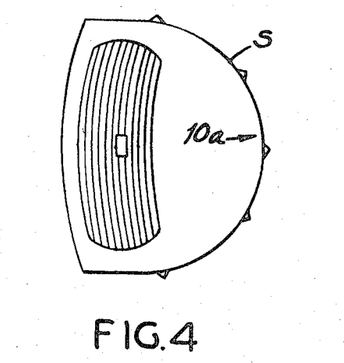
Figure 5:
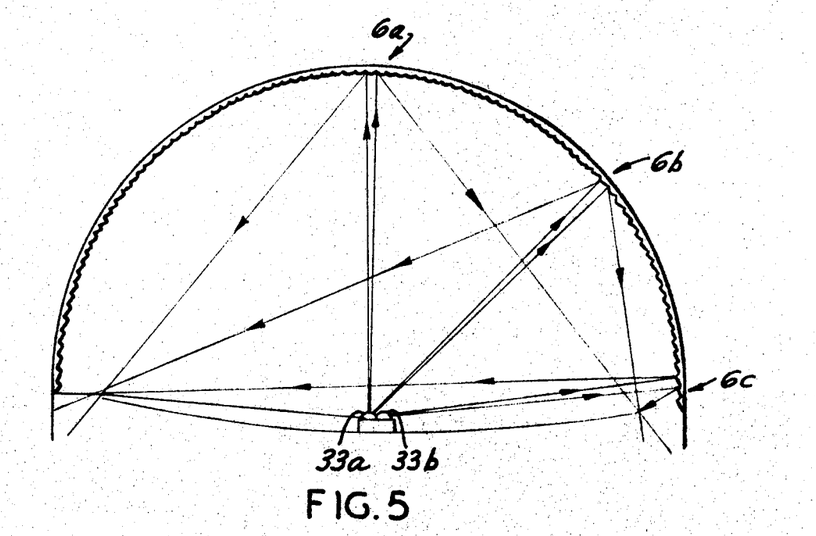
FIGS. 5 to 16 show concave viewing screens and surface portions utilizing mosaic elements employed in the construction of the screens.
Figure 6:
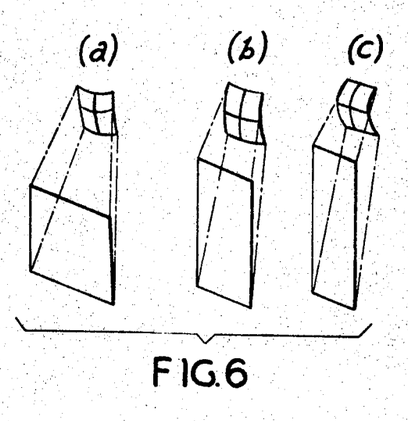
Figure 7:
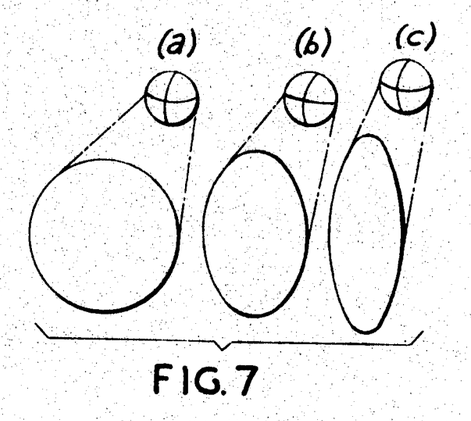

The concave screen "S" shown in FIGS. 1 and 2 (FIG. 2 is a top view of FIG. 1), while substantially hemispherical has a somewhat marshmallow or obloidal shape. That is to say, the central portion 10 of the concave screen and the sides 10b are partly flattened. In the embodiment of FIGS. 3 and 4, the central and side concave portions 10a are more spherically shaped.

While it is appreciated that planetariums and some recent theater developments use a hemisphere above the audience with the audience on the ground floor looking up, this position is physically tiring to the spectator and psychologically unnatural, since the spectator is used to looking ahead at the world, while walking or driving; rarely up at it. In order for the spectator to look ahead, and yet to have a completely free horizontal visual field requires a special arrangement whereby the spectators sit substantially above one another.

Both the hemispherical and obloidal screens completely fill the spectator's free visual field with imagery 170° horizontally and 120° vertically, the only limitations being those imposed by the other spectators, his own body, and evacuation hood above his head.

The concave screen depicted by FIGS. 1 and 2 is advantageous in that it allows the entire audience to be further away from the central and most important part of the screen, thus providing better definition and more comfortable eye focusing. Additionally, it frees the key central part of the image from the serious spherical distortion that necessarily accompanies spherical screens. Thus, in the key central part of the picture where the screen is flattened, buildings, telephone poles and horizon lines are straight rather than curved.

Referring to FIG. 1, steeply rising steps 11 are shown for supporting viewing chairs. A projection system 12 is located centrally and in front of concave portion 10 of the screen. Loudspeakers 13 are strategically placed and spaced about the back or convex portion of the screen. As shown in the drawing, the front or concave screen is made up of a plurality of facets or mosaic elements 14 (to be described in more detail later) shaped and disposed at a predetermined angle of reflection, such that rays of light directed to any of said faces from the projection system 12 by means of a wide angle lense are caused to reflect back to the viewing audience without bounding from one section of the screen to the other. Thus, ray 15a (FIG. 1) is shown reflected via ray 15b to the top of the viewing stand, while ray 16a is shown reflected to the bottom but away from the screen. The same is true of rays 17a, 17b and 18a, 18b, etc.

By using a screen of the foregoing type with substantially full peripheral vision, new and improved the 3-dimensional or 3-D effects can be achieved. The term "3-D" is understood to be a shorthand designation for the term "three dimensional projection."

Peripheral imagery without 3-D is not usually satisfactory because the spectator's natural binocular vision can immediately sense that the film's monocular image is lying flat on a deeply curved surface.

Equally unsatisfactory is 3-D without peripheral imagery because the 3-D images which appear to be floating in space seem unnaturally truncated by the edges of the conventionally rectangular screen. For example, a man whose head and shoulders are floating in the space before a viewer appears as if some giant sword has sliced off his trunk and legs at the point where it touches the edges of the frame.

3-dimensional pictures may be obtained with the invention by projecting a left and right eyed image from two motion picture or television projectors 19 and 20 (FIG. 2) through polarized filters, each angled at 90° from each other.

The surface of the screen should advantageously be aluminized in order for the light reflected from it to maintain its polarization. But if the surface of either the hemispherical or obloidal screen are aluminized without special precaution serious problems may arise. First, hot spots may appear to the spectator wherever the angle of the incident is the same as the angle of the reflected light and, secondly, light will bounce from one surface to another, causing a serious washing out or graying of image contrast. Hence the surface of the aluminized screen should preferably be constructed of a mosaic of elements each disposed relatively to impinging rays such that the rays are evenly reflected back to the audience while none of the rays is reflected to the other screen surfaces. Examples of various mosaic elements which may be employed are shown in FIGS. 5 to 16.

The mosaic elements making up the concave screen may comprise aluminized metal, plastic or glass elements formed so that individual squares or hexagonal surfaces or faces are each individually aimed to reflect the rays coming from the projector to the audience. The mosaic element should be capable of being angled in different planes, for example, by being adjustably mounted on ball sockets as in FIG. 13. There, it will be noted that various methods of mounting the mosaic element are depicted. The supporting base of the screen 21 is shown to be perforated with holes 22 through which sound from mounted loudspeaker 23 passes. Attached to supporting base 21 are elements 24a to 24d, all of which illustrate various methods of locking the element. Thus, element 24a illustrates a ball socket mounting using a rear screw 25; element 24b a side screw 26; element 24c a front screw 27; and element 24d a biasing spring 28.

Figure 12:
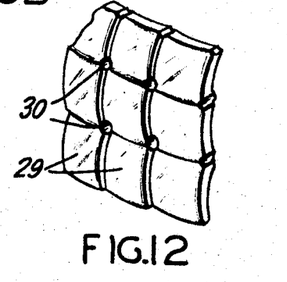
Figure 13:
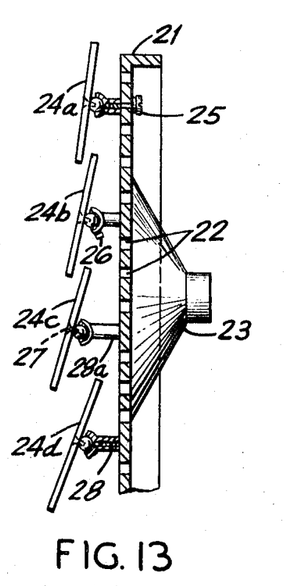
Figure 14:
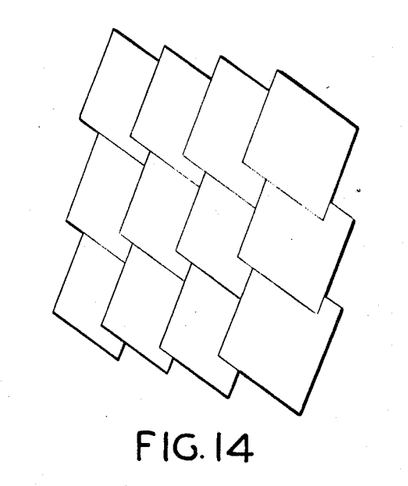
Figure 15:
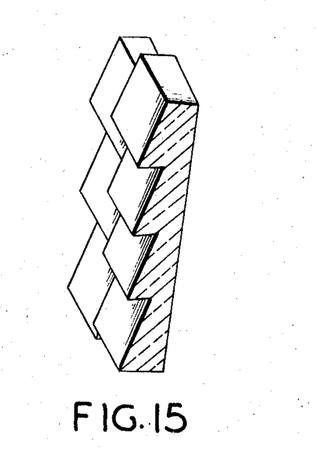
Figure 16:
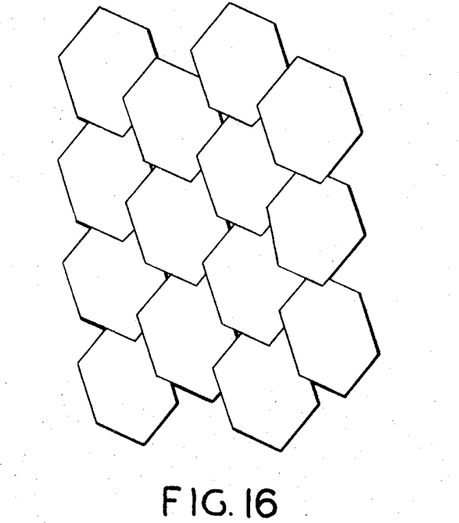

Another embodiment employing the same principle is to form plastic or glass elements having a front or rear coating of silver to form hundreds of tiny (½" to ⅟₁₆") convex mirrors 29 or semi-mirrors as in FIG. 12. Each of the mosaic surfaces may either be an actual mirror, or a metallized reflective surface having a matte finish which reflects a light with more diffusion than a true mirror, but less diffusion than reflection from a white surface (a white paper surface). Each mirror is set at a specific angle such as the plates described above, but in addition, each mirror has a particular vertical and horizontal curvature that reflects a specific light pattern which exactly covers the audience from that position (note FIGS. 6 and 7). Holes 30 for sound are provided at the corners. Thus, referring to FIGS. 6 and 7, the central mirrors reflect the widest patterns (6a) while the side mirrors (6b, 6c) reflect narrower and narrower patterns. The advantage of this mirror system, squarish mirrors, FIGS. 6a, b, c, for the obloidal screen (FIG. 9) and round mirrors, FIGS. 7a, b, c, for the spherical screen (FIG. 8) is: (1) maintenance of polarization; (2) minimizing of hot spots; (3) maximum utilization of available light energy.

Figure 10:
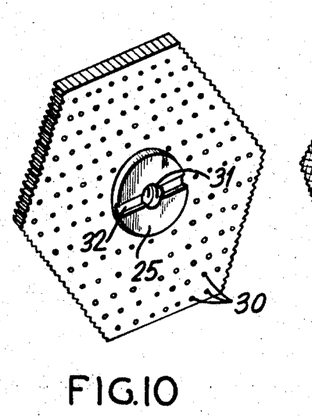
Figure 11:
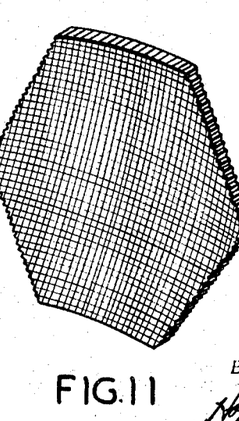

Thousands of mirrors (or semi-mirrors) may be pressed into one plate as shown in FIGS. 10, 11, 12 and 15. These mirrors can be either square or hexagonal (note FIGS. 14 and 16), and curved or flat (note FIGS. 12 and 15), depending on their position in the overall screen. At the juncture of the small convex mirror surfaces tiny holes 30 are provided to allow sound to pass through the screen as shown in FIGS. 10 and 12. The panels are numbered in the back for proper locating, and fitted with a female thread (31) and key slot 32 for quick mounting onto a rear support frame.

Figure 8:
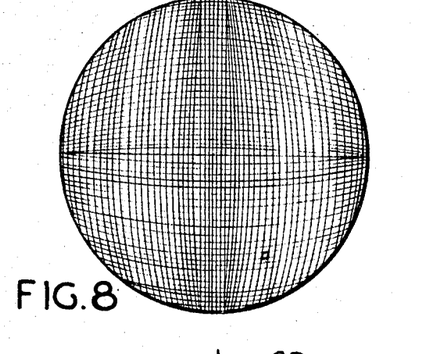
Figure 8A:
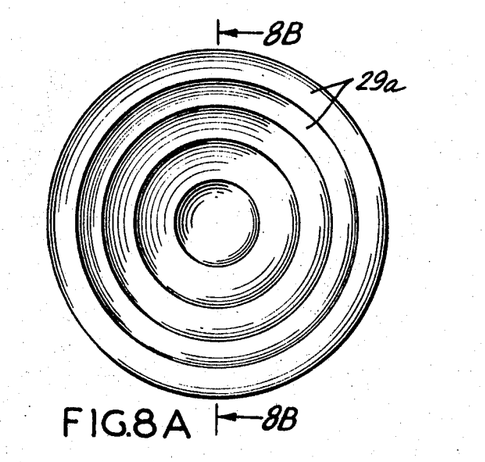
Figure 8B:
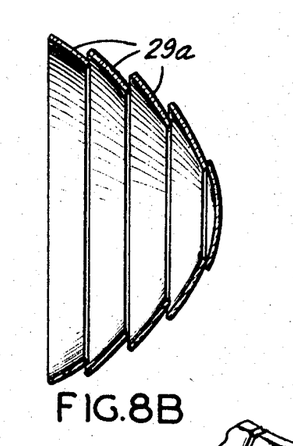
Figure 9:
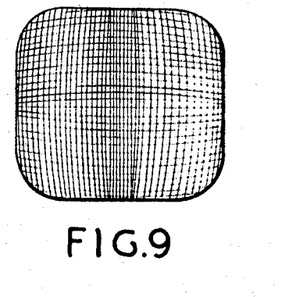

Another form of concave screen is that shown in FIGS. 8A and 8B which depict a spherical screen made up of aluminized surfaces in the form of concentrically located annular segments 29a, each angled to reflect the light back to the audience while none is reflected to other parts of the screen.

Two projectors 33a and 33b (FIG. 5) are mounted at the center of the plane of support of the viewing chairs. The projectors are adapted to be synchronized mechanically or electrically and equipped with wide angle 170°–180° lenses and polarizing filters.

Figures 21, 22:
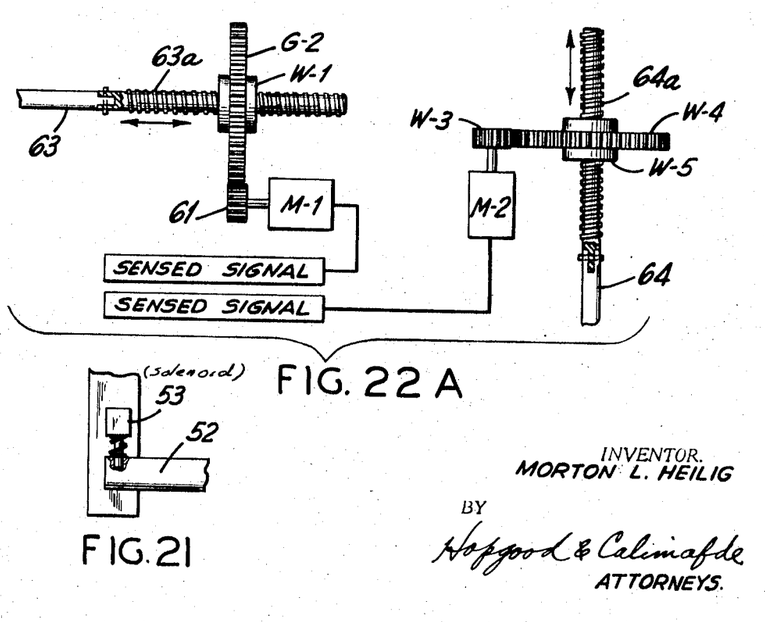
FIGS. 22 and 23 show in detail two embodiments of a viewing chair provided by the invention.
Figure 22:
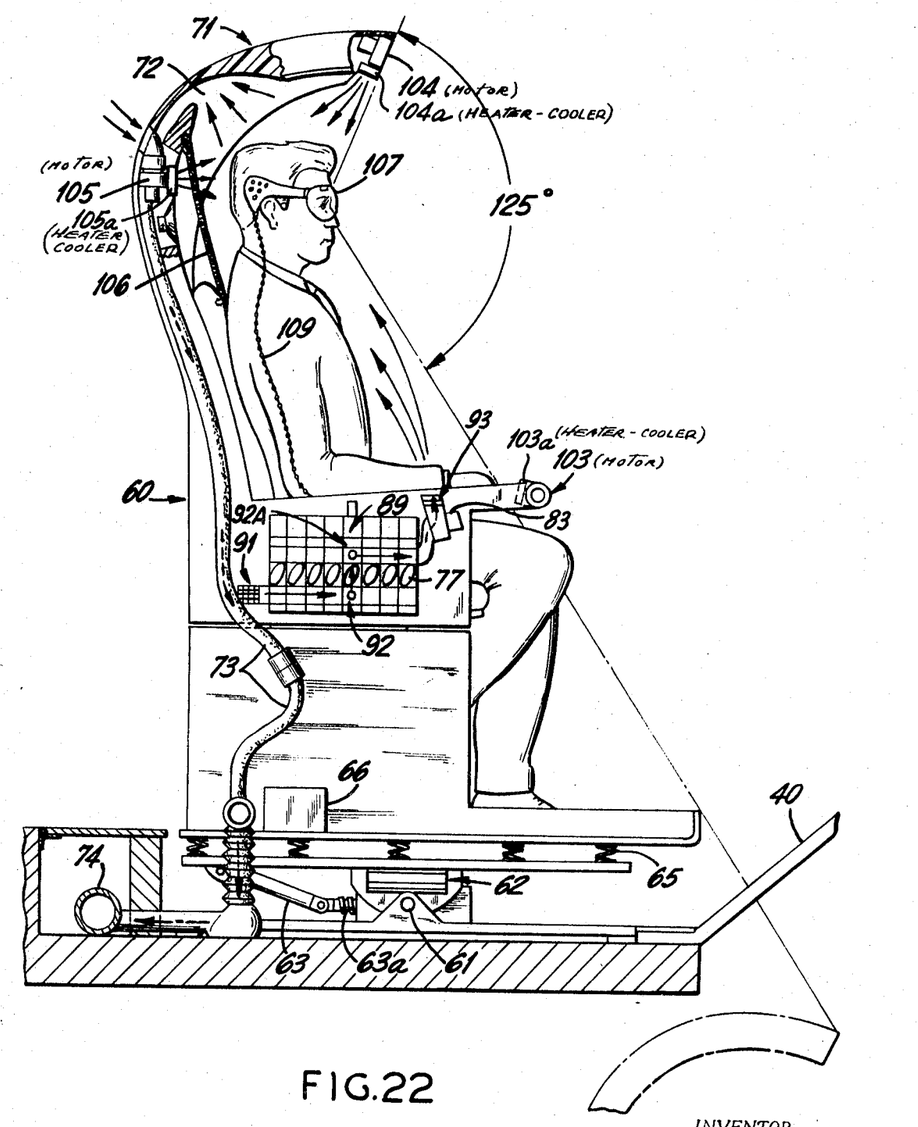
Figure 23:
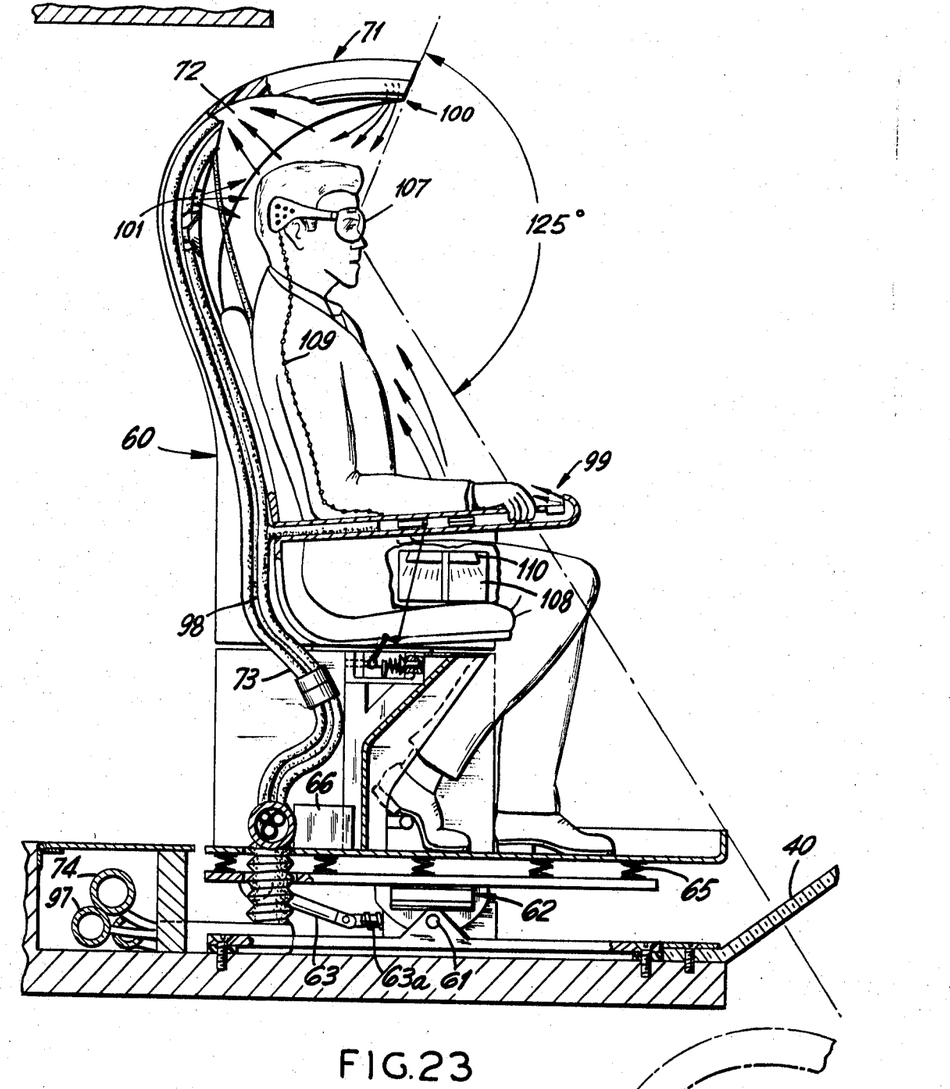

Either a separate 5 to 30 channel tape playback synchronized to the projection system or magnetic tracks on the film itself (see FIGS. 35 and 36) may feed 5 to 30 speakers located behind the screen and small speakers placed behind the head of each spectator (note FIGS. 22 and 23).

To keep the spectator's vertical field free of obstruction, it has been found advantageous to place them one above the other. This can be directly one above the other in very small theaters (of 3 or 4 rows), but in larger theaters a completely vertical placement of the audience would result in a real physical danger from falling and a frightening psychological sense of insecurity for those on the upper levels.

Figure 17:
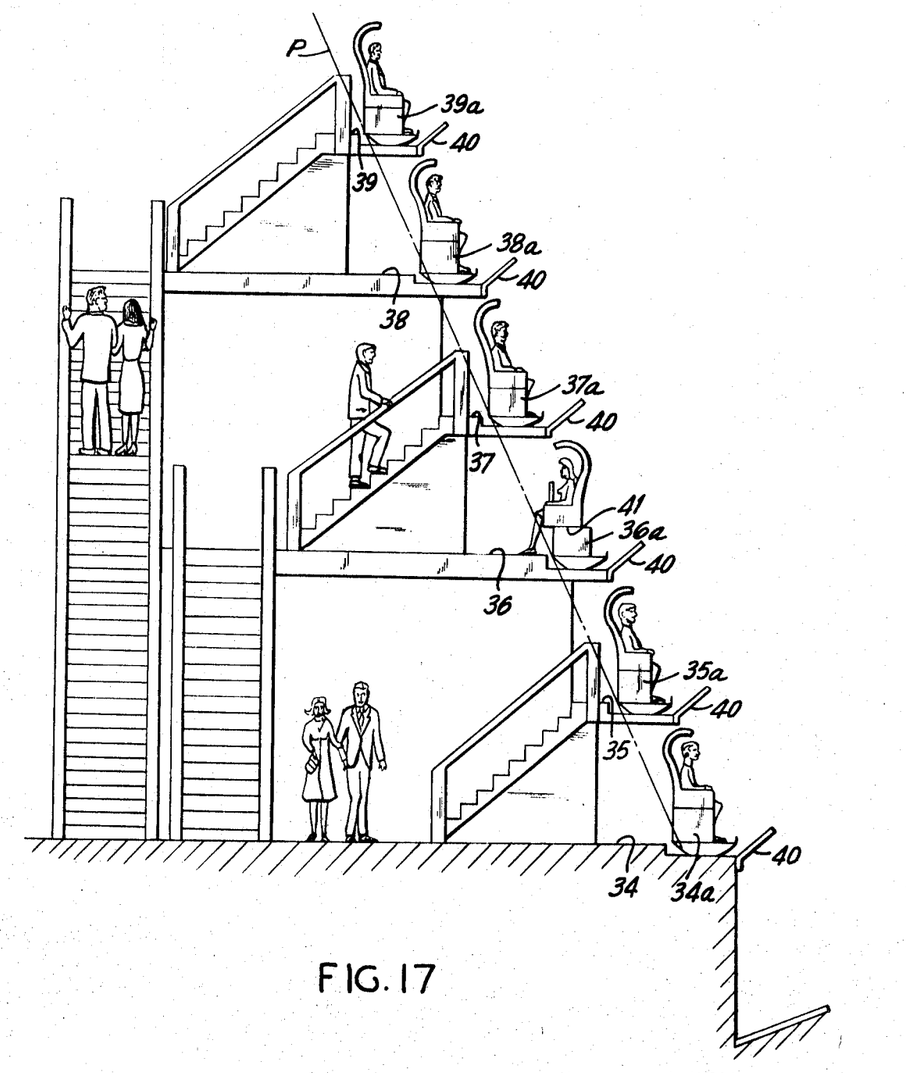
FIG. 17 is illustrative of one means for arranging viewing chairs in accordance with the carrying out of one embodiment of the invention.

These problems are solved by supporting the audience in a plane "P," 65° from the horizontal (FIGS. 1 and 17). This offers safety as well as a greater sense of security. Referring to FIG. 17, six levels 34 to 39 are provided for supporting chairs 34a to 39a. With regard to FIG. 17, safety can be further enhanced by having a transparent or glass or plastic sheet 40 extend at an angle of approximately 38° from the horizontal. The spectator can be held back by this and yet see through it. Safety may be provided, however, by the manner in which the spectator gets to and from his seat and by the safety features of the seat itself.

Figure 19:
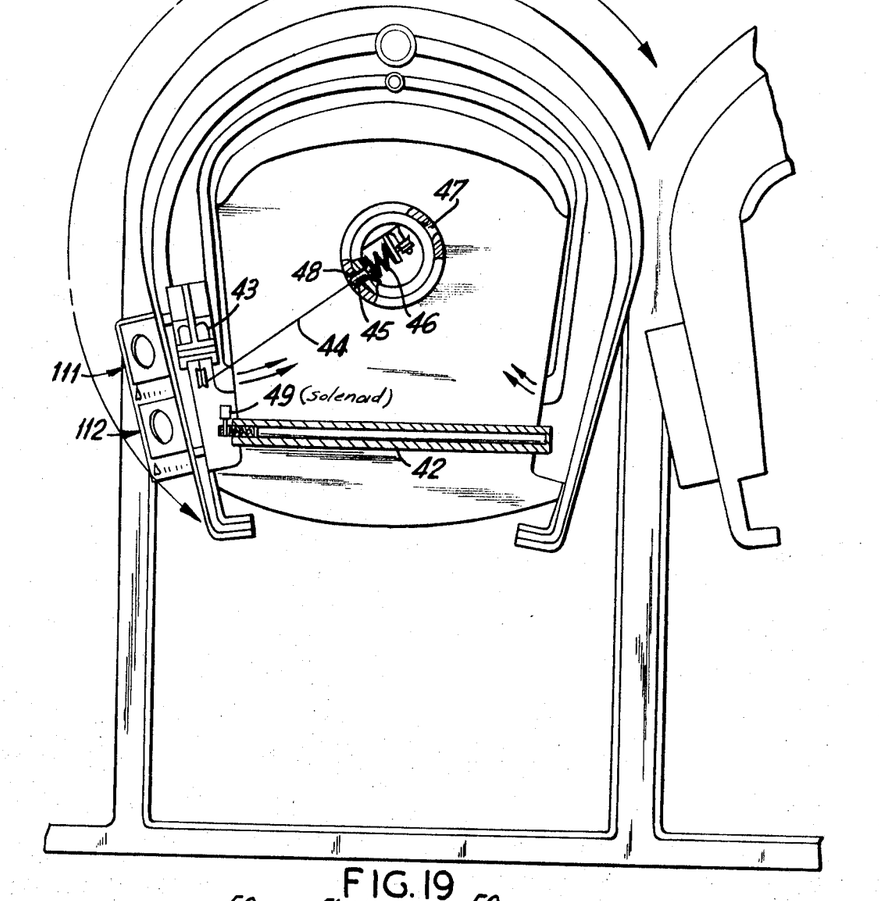

In the embodiment shown in FIG. 17, the spectators rise to the appropriate level by escalator or elevator and then approach their seats from the rear of the spectator plane "P." The chairs are adapted to swivel at a point 41 just beneath the seat, so that the empty seat is facing away from the screen toward the approaching spectator. He sits in the chair then lowers the safety cross bar 42 shown in FIG. 19 which locks automatically. Only when this bar is down can the spectator pull finger loops 43 which via cable 44 cause pin 45 to pull against biasing spring 46 out of hole 47 and allow the chair to spin around and face the theater. The pin then drops into hole 48 setting the chair in the forward looking position. Solenoid 49 is provided to prevent the safety bar from being reopened until the chair is spun back to the rear facing position.

Figure 18:
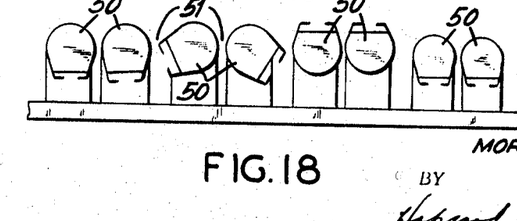
FIGS. 18 to 21 relate to chair arrangements and manipulation.

Chairs 50 are spaced in couples (note FIG. 18) with a space of approximately one foot between each couple. This allows the spectator in a chair on either side of the space (note 51) to spin in that direction and get his knees and feet through. The spectator rotates the chair by pushing with his feet against the base which does not turn. Thus, the spectators approach their chairs from the rear, lock the cross bar, spin around, watch the show, then spin back, raise the cross bar and get out with complete safety. This system is desirable for shows of 40 minutes or longer where spectators must be able to leave their chairs at will to go to the rest room.

Figure 20:
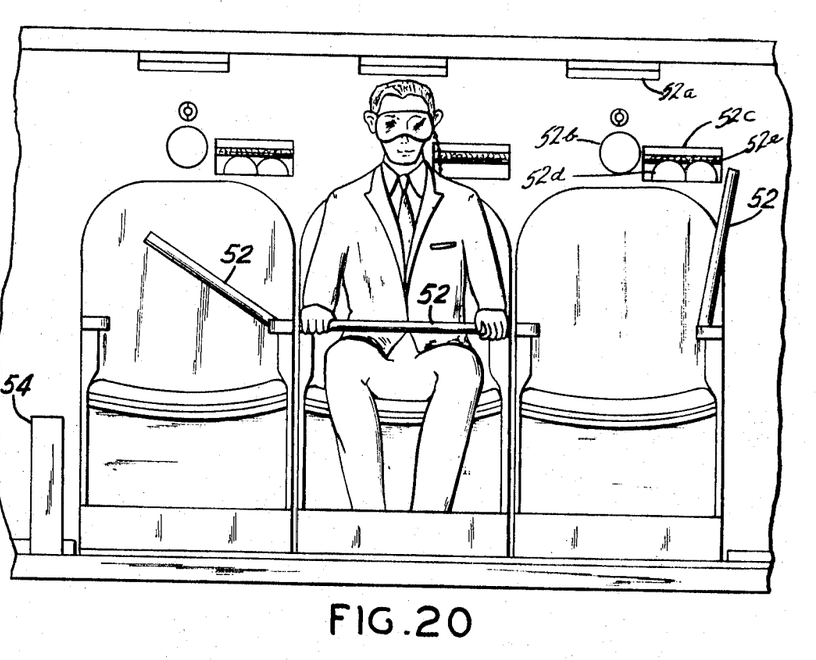
Figures 27, 28:
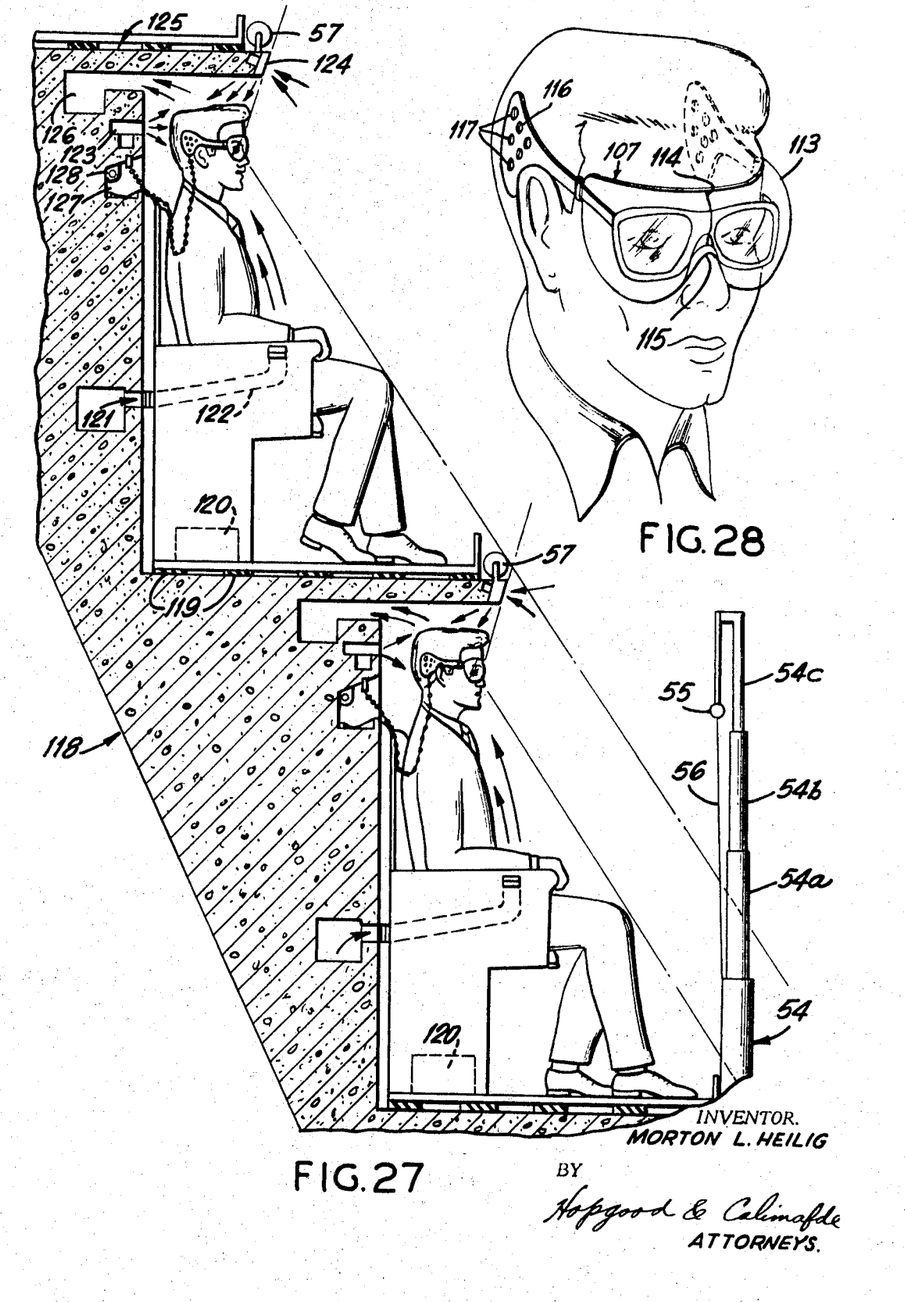
FIG. 27 shows another arrangement of chairs which may be employed in the invention.
FIG. 28 is illustrative of a pair of peripheral polarizing glasses capable of three dimensional visualization (3–D) for use in the experience theater.
Figure 29:
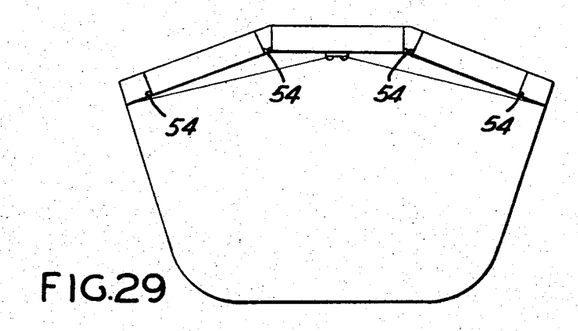
FIGS. 29 to 34 are illustrative of various forms of seating arrangements which may be employed in the experience theater.

In a less elaborate form of the experience theater shown in FIGS. 20, 21 and 27 which would be used for shows under 40 minutes, the spectators approach and leave their seats from the front much as in a normal theater, except that they do so during intermission when the lights are on. The safety is provided in the following manner:

All cross bars 52 (FIG. 20) are electrically locked by a spring biased solenoid 53 while the show is on. When the last scene of the film fades into darkness, hydraulic arms 54 (note FIGS. 20 and 27) located at each side of a bank of chairs that comprise each row (note FIG. 29) rises to a height of about 4' and 7½" by means of telescoping members 54a, 54b and 54c which raise a bar 55 up to a height of about 3 feet 9 inches. The rising bar unravels a thick yet flexible plastic sheet 56 from a roll 57 (hidden by jack 54 but shown at other levels) thus creating a wall to protect the spectator. Once the plastic wall is up, the solenoid is actuated to free safety bar 52 (note FIG. 21), allowing each spectator to raise his safety bar. The spectators can then stand and exit single file in both directions, holding on to raised bar 55 (FIG. 27) for balance. When the theater is empty, new spectators enter from either side, sit in their seats, and lower their safety cross bars. Once the theater is full, all cross bars are locked by switch actuated means (not shown), and the lights go down. In the darkness, hydraulic arms 54 lower and the plastic wall is pulled back on roll 57 by means of a spring coiled mechanism (not shown) completely freeing the spectators' field of view for the show which then starts. The wall behind each chair in FIG. 20, shows the grid 52a of an evacuation channel for removing previously supplied fragrances, a loudspeaker 52b, and a recess 52c for holding Polaroid glasses 52d and a germicidal lamp 52e.

The seats or chairs of the experience theater are important in carrying out one embodiment of the invention by providing many of the sensory stimuli.

Referring to FIGS. 22 and 23, a preferred embodiment of a viewing chair 60 is shown supported by a double acting swivel along two axes 61, 62 disposed at right angles to each other. Arm 63 which may be gear or hydraulic driven, controls the front-back pitch in relationship to the scene of the screen. Arm 64 (not shown here) similarly controls sideways tilt (note FIG. 22A). Thus, the spectators watching scenes taken from a motorcycle or airplane will pitch and tilt just as the vehicle does, thus strongly reinforcing the spectator's feeling that he is physically on the vehicle. The rest of the chair floats on a bed of springs (or optionally, foam rubber). A vibrator or oscillator 66 is provided to vibrate the rest of the chair in the rhythm appropriate to the scene, such as the varying speeds and surges and bumps of a speedboat. These vibrations are communicated to every part that touches the chair, i.e. the feet, the legs, the buttocks, the arms and the back, just as would happen if the spectator were actually sitting in a speedboat. The oscillator is variable and controlled by either pitch or volume variations on one channel of the magnetic guide track on the film.

Figure 35:
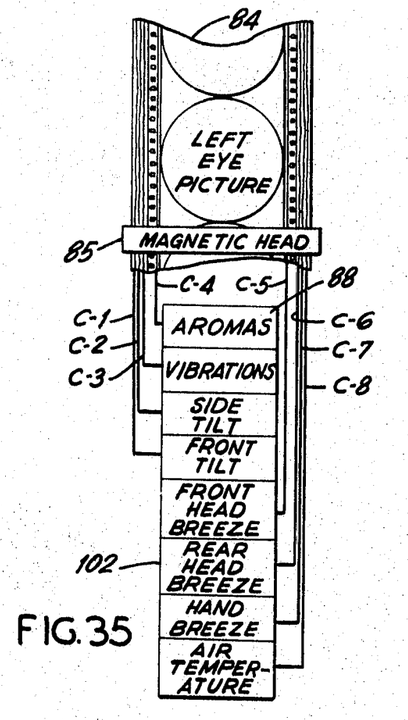
FIGS. 35 and 36 are block diagrams coordinating signal producing stimuli on a film with sense-stimulating elements.

FIG. 22A shows one method of tilting the chair using a pair of reversible motors M–1, M–2, which are activated by a sensed signal (note FIG. 35). Thus, motor M–1 causes gear 61 to rotate and in turn meshing gear G–2. Coaxially mounted with gear G–2 is an internally threaded worm gear W–1 which rides on driven worm gear 63a, worm gear 63a being driven in either direction as shown by the arrows, which gear in turn actuates pivotally mounted arm 63 for tilting the chair back and forth about axis 61 (FIG. 22). Motor M–2 similarly actuates arm 64 via gears W–3 and W–4, internal worm gear W–5 and worm gear 64a.

Aroma systems without 3–D have been attempted in the past but they have always failed because of the psychological paradox of smelling a flat two-dimensional image. Odor implies a physical reality—a palpable presence—thus, the object providing the aroma should preferably be three-dimensional, if a satisfactory natural impression is to be made on the spectator.

Figures 25, 26:
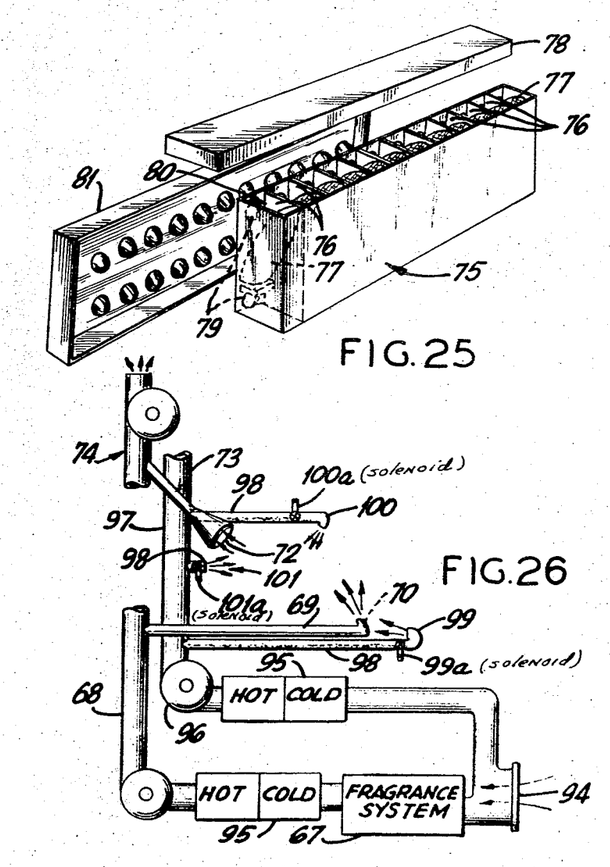
FIG. 26 depicts an air distributing system employed in combination with the viewing chairs.

Aromas are provided in one of two ways, either from a central, electronically controlled fragrance system, FIG. 26 (note 67) through a fixed tube 68 and then flexible tube system 69. The aromas are carried into one or both arms of the chair and directed upward, towards the face through a small slotted hole 70. One of the serious problems with other attempts to add aromas to films has been the contamination of the theater air with one odor and the inability to clear the air of this aroma before the next one arrived.

The experience theater chair solves this problem by placing a hood 71 (FIGS. 22 and 23) over the spectator's head, and by applying mild suction through hole 72 so that the fragrance laden air is immediately evacuated once it passes the face. This air is evacuated through flexible tube 73 then rigid tubing 74 system and expelled from the theater.

Another way of providing aromas is to put individual aroma cartridges 75 (FIGS. 24 and 25) into the arm of each chair (FIG. 22). The cartridge may comprise a plastic box with, for example, twelve fragrance slots 76. An appropriate wire mesh containing solid aroma pellets 77 is placed in each chamber. The top cover 78 is put on and then the two holes 79 in the side of each chamber 80 are plugged by a side cover 81 with protruding plugs on the inside. A door 82 located on the spacious side of chair is opened, the side cover removed and the cartridge put in.

The system works in the following manner. Blower 83 is activated whenever a fragrance is desired. This creates a negative air pressure. One channel on the film's (84 in FIG. 35) magnetic track carries specific frequencies which are related to specific odors. Note channels C–1 (front tilt), C–2 (side tilt), C–3 (vibrations) and C–4 (aromas) in FIG. 35. Whenever the film calls for a given odor, the appropriate signal on channel C–4 activates magnetic head 85 which through electronic filters and amplification (not shown) causes a signal to be sent to solenoids in all of the chairs corresponding to odor stimulation 88 in FIG. 35. The solenoid 89 (FIG. 24) raises bar 90 to a position where the two holes 79A (FIG. 24) in the bar (which normally act as closed gates) and allows air to pass through it.

Figure 24:
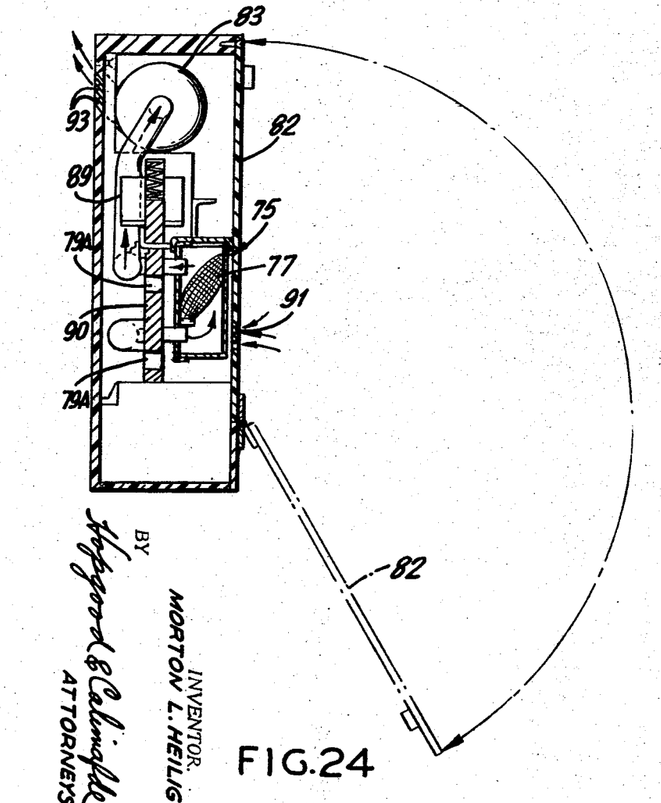
FIGS. 24 and 25 are illustrative of means which may be employed in producing aromas.

Odorless air is sucked into the chamber now heavily saturated with fragrance through holes 91, 92 and sucked out again through hole 92A and then blown gently up toward the face through latticed hole 93. The whole system may be easily removed for servicing and repair.

Figure 36:
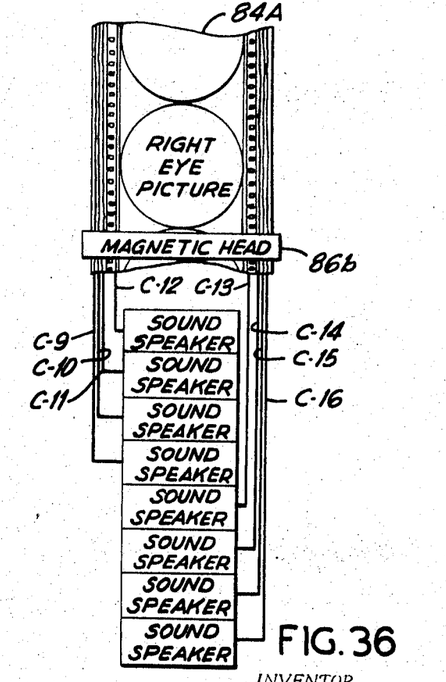

Breezes of varying velocities to produce tactile sensations can also be provided in the experience theater in several ways. A central air system shown in FIG. 26 takes air in through a filter 94 from the outside, heats it or cools it in a temperature control chamber 95 depending on the scene (i.e. steel mill-hot; water skiing-cool, etc.) and then applies pressure from one large blower 96 whose speed is controlled by either the varying pitch or volume of one channel on the magnetic sound track (note FIG. 35). This air is then led through a fixed 97 and flexible duct 98 to four points of all chairs (FIG. 23); the furthest point of each arm 99 blowing breezes back onto the hand, the central front part of hood 100 blowing breezes down onto the face and back over the hair and the rear of head and behind the head 101 blowing forward. Each of these exits are open or closed by solenoids 99a, 100a and 101a controlled by the film's magnetic track in such a way that breeze blows either from the front or the back or only on the head to produce the tactile sensation indicated generally by the numeral 102 (FIGS. 35 and 36).

Another way of supplying breezes to the same points of the body is to have very small electrically controlled blowers 103, 104 and 105 placed at these points in the chair shown in FIG. 22. In this case, a signal turning the motor on and off and governing the velocity of the motor eliminates the need for solenoid gates as in the first breeze system.

Each blower has its own air intake from the theater air and each one is also equipped with tiny heating and cooling units to vary the temperature of the air according to the scene.

A soft plastic sheet 106 (FIG. 22) with holes for the passing of sound and air is placed behind the head so the spectator can lean back if he desires. This is important for the seats in the lower rows which may be tilted slightly back to allow their occupants a more comfortable view of the screen. The left and right eyed images reach the appropriate eye of the spectator through the use of Polaroid glasses 107 (FIGS. 22, 23 and 28).

The glasses are contained in small container 108 shown in FIG. 23 on the roomy side of the chair, and attached by fine supply chain 109 to prevent their getting lost or stolen. The box contains a germicidal lamp 110 to disinfect the glasses. This lamp is adapted to light up during intermission.

The box is divided into two compartments (FIG. 19), one to hold the smaller glass for people who don't wear glasses 111 and the other 112 a larger glass which fits easily over all pairs of prescription glasses.

The design of the polarized glasses is important in achieving the full advantages of the preferred aspects of the invention (FIG. 28). One of the main reasons why 3–D movies have not been too successful has been the flimsy uncomfortable nature of the very cheap paper glasses which have been used.

The glasses employed with the experience theater, while still relatively inexpensive, are strong quality glasses that are designed in such a way that within a few minutes the spectator completely forgets that he is wearing them.

This is accomplished first by having the polarized filters 113 so large and curved as to extend beyond the widest peripheral range of the eye in both the horizontal and vertical direction and also large enough to cover any glasses worn by the spectator. As will be noted in FIG. 28, the glasses are formed of two halves which meet centrally above the nose at 114, the two halves each curving about each side of the face above the cheek bones to provide a wide angle field of view, and each polarized at 90° to the other.

To minimize pressure points on the face and head, the edges of the polarizers are carefully rounded and the nose support broad and carefully molded at 115. The side head clasps 116 are contoured to the head and broadened to a wing-like structure in order to distribute the pressure. It is perforated by holes at 117 to allow the rear and front air breezes to penetrate, thus minimizing the head's awareness of the broad clasp.

The seat design of the simpler version of the experience theater shown in FIG. 27 accomplishes substantially the same effects as those described in FIGS. 18 to 23 except that the chair does not tilt. The major difference is that the concrete structure of the theater wall 118 itself assumes many of the functions built into the more elaborate chair.

The chair floats on strips of rubber 119 and may be caused to vibrate by means of vibrator 120. Aromas are fed through a central system 121 through a tube in the arm 122. Instead of using a breeze blower to the hand, for economy rear and upper face blowers 123, 124 are built right into the concrete. A straight concrete overhang 125 replaces the elaborate chair's hood and traps the fragrances and evacuates them through a wall channel 126. The Polaroid glasses are held in a recess 127 in the cement to the rear and side of the head. It also contains a germicidal lamp 128 which is actuated during intermission.

The experience theater is the first theater which gives its audience a total illusion of being physically carried into a completely different environment. This is achieved by combining all the sense stimuli into one unified system. Thus, the experience theater provides the art with a new and substantially broadened medium of entertainment.

As will be apparent to those skilled in the art, the novel screen and theater provided by the invention may take on various embodiments, depending upon the seating capacity desired in the theater.

Figure 31:
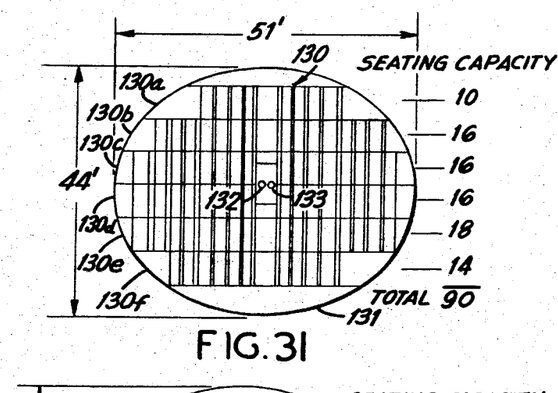

Referring to FIG. 31, a view is shown in elevation looking from the screen and facing viewing chairs designated generally by numeral 130, the periphery 131 representing the outline of the somewhat hemispherically shaped screen. The height of the theater as measured across the vertical mouth of the screen is about 44 feet and the width about 51 feet. Six rows of seats 130a to 130f are shown, providing an aggregate seating total of 90 spectators. Projection cameras 132, 133 are shown located substantially centrally of the seats, said cameras being adapted for use in 3-D movies using polarized light and polarized viewing lenses.

Figure 32:
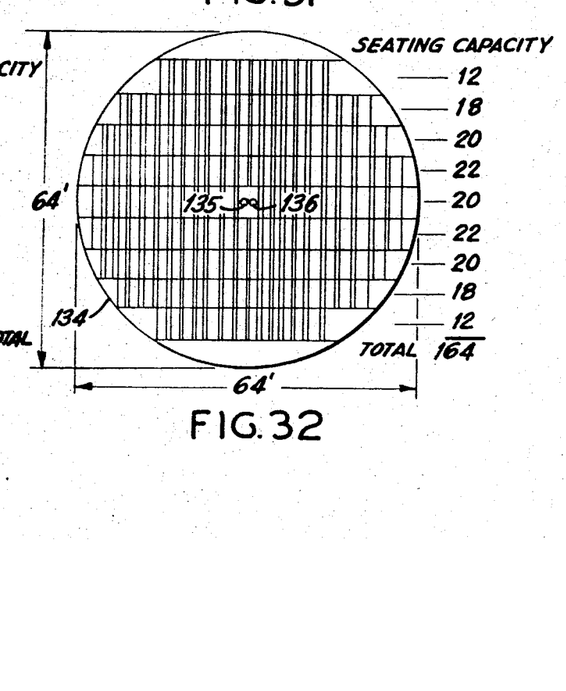

In the more elabtorate theater of FIG. 32, similarly viewed as in FIG. 31, the height of the theater as measured across the mouth of hemispherical screen 134 would be about 64 feet, the width being substantially the same. Nine rows of seats are provided having a seating capacity of about 164 spectators. A pair of cameras 135, 136 are located centrally of the seats.

Figure 30:
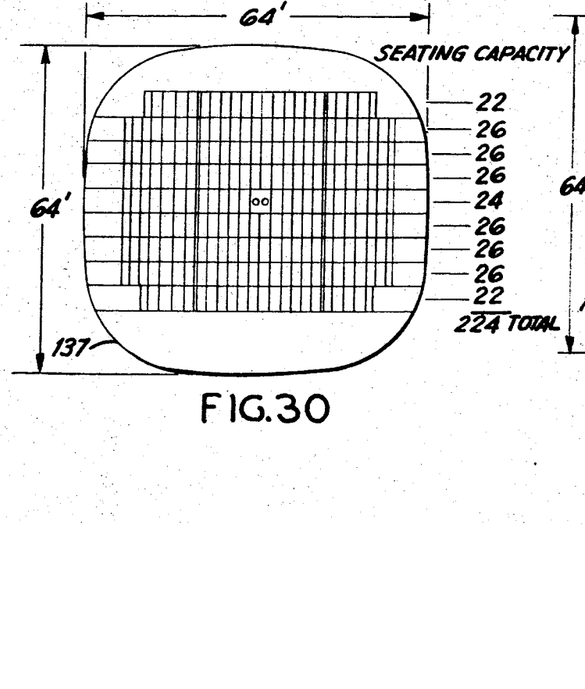
Figure 33:
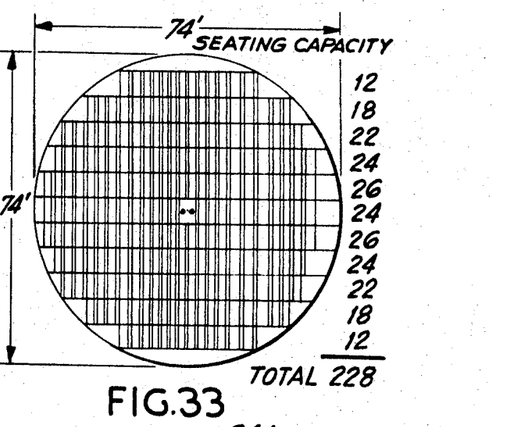

FIG. 33 depicts still another embodiment similar to FIG. 32 but having a height of 74 feet and seating an aggregate of about 228 spectators. Theaters having a squarish screen 137 as in FIG. 30 but designed with the substantially hemispherical shape (i.e. having a marshmallow or obloidal contour) can be designed to provide even a larger seating capacity. Thus, in FIG. 30, nine rows of seats are provided having a seating capacity of 224 spectators.

Figure 34:
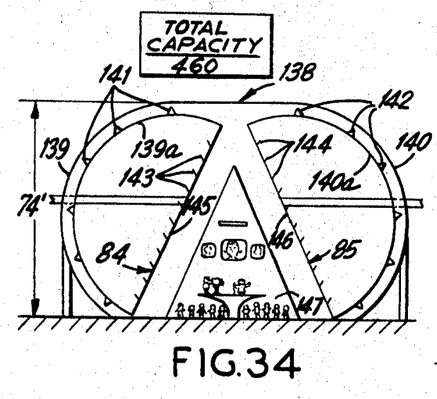

Since the seating arrangement of the experience theater is predicated on using a height greater than the horizontal extension of the theater, a practical way of increasing the seating capacity is to place two theaters back to back as shown in FIG. 34. The double theater is characterized by an overall enclosure 138 having two hemispherical ends 139 and 140, each enclosing a substantially hemispherical screen 139a and 140a, the convex side of each screen having strategically located loudspeakers 141 and 142. Steeply inclined seats 143, 144 are provided, respectively, in each of the theaters the seats being supported along plane supports 145, 146 as shown. The two theaters can either show the same program simultaneously, or different ones simultaneously. Or they can show the same program at staggered times so the people anxious to see the show need only wait half the time before the next shown beings. In the double theater shown, which may have a capacity of 460 spectators, an entertainment lobby 147 may be provided having means shown for keeping the spectators occupied while waiting for the next show.

By using the combination of the novel chair and novel screen, the sense-stimulating devices associated with each of the chairs can be programmed or coordinated with signal means in the form of magnetic tracings or channels as shown for film 84, 84A in the block diagram of FIGS. 35 and 36. Left and right eye films (84, 84A) are shown by way of example for the projection of 3-D movies. Channels C-1 to C-8 on film 84 are related to various senses shown in the block diagram while channels C-9 to C-16 relate to distribution of sounds to the various loudspeakers. Of course, where 3-D movies are not involved and only one film is employed, the film may be adapted to carry all of the necessary signal responses.

While magnetic channels are shown associated with each of the films, it will be appreciated by those skilled in the art that all of the magnetic signals could in the alternative be carried on a separate reel of magnetic tape synchronized with the two picture reels. Also, where the television principle of transmission is employed using videotapes, two videotapes may be employed for transmitting the left and right eyed images.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a motion picture or television theater, the combination including,
   a projection screen of concave configuration of substantially hemispherical sweep embracing substantially the entire normal field of vision of a spectator viewing the screen in a substantially horizontal direction while in a vertical seated position,
   said screen being formed of a plurality of mosaic elements the faces of which together define the surface of the concave screen while being disposed at a predetermined reflective angle, such that rays of incident light are reflected from said faces back to the viewing audience without bounding from one section of the screen to the other,
   a projection system adapted for wide angle projection located substantially centrally of said screen,
   a plurality of loudspeakers located within said theater to provide sound effects,
   a plurality of viewing chairs whose plane of support is steeply inclined to horizontal,
   the plane of support of said chairs subtending in the vertical direction the substantially hemispherical sweep of said concave screen to provide free field of vision for each of the spectators over a horizontal angle of up to about 185° and a vertical angle of up to about 150°, and
   sense-stimulating means associated with each of the chairs.

2. The theater of claim 1, wherein the central and side portions of the concave screen are flattened to provide a substantially rectangular outline centrally and on the sides of said substantially hemispherical screen.

3. The theater of claim 1, wherein the sense-stimulating means associated with each chair includes means for providing tactile sensations via a hot or cold breeze and vibrations, means for providing an odor, means for evacuating the odor, means for providing dimensional sound, and means for providing kinesthetic effects.

4. The theater of claim 3, wherein means responsive to signal means associated with a projection film or videotape system is provided for coordinating a plurality of said sense-stimulating means for each chair.

5. The theater of claim 3, adapted for 3-D projection, wherein two projection means are provided for projecting on the same screen a right eye image and a left eye image, and wherein a pair of wide angled polarizing glasses is provided associated with each chair, with the right lense adapted to view only the right eye image and the left lense adapted to view only the left eye image, thereby producing a 3-D peripheral effect.

6. In a motion picture or television theater, the combination including a wide angled projection system for projecting a visual image on a screen, a projection screen of concave configuration of substantially hemispherical sweep embracing substantially the entire normal field of vision of a spectator viewing the screen in a substantially horizontal direction while in a normal vertical seated position, said concave screen being formed of a plurality of reflective mosaic elements, each of the faces of the elements defining said concave screen being disposed at a predetermined reflecting angle, such that rays of light directed to any of said faces from said projection system located in front of and substantially centrally of said concave screen are caused to reflect back to a viewing audience without bounding from one section of the screen to the other, a plurality of spaced apart loudspeakers located back of said screen to provide sound effects, a plurality of viewing chairs whose plane of support is steeply inclined to the horizontal, the plane of support of said chairs subtending in the substantially vertical direction the substantially hemispherical sweep of said concave screen, sense-stimulating means associated with each of said chairs, said means including means for providing tactile sensations via a hot or cold breeze and vibrations, means for providing an odor, means for evacuating said odor, means for providing dimensional sound, means for providing kinesthetic effects, and means responsive to signal means associated with a projection film or videotape for coordinating a plurality of said sense-stimulating means for each chair.

7. The theater of claim 6, wherein the mosaic elements of said concave screen are adjustably mounted, whereby the reflecting angle of each can be adjustably determined.

8. The theater of claim 6, wherein the central portion and sides of the concave screen are flattened to provide a substantially rectangular outline centrally of said substantially hemispherical screen.

9. The theater of claim 6, adapted for 3-D projection, wherein two projection means are provided for projecting on the same screen a right eye peripheral image and a left eye peripheral image, and wherein a pair of wide angled polarizing glasses is provided associated with each chair, with the right lense adapted to view only the right eye image and the left lense adapted to view only the left eye image, thereby producing a 3-D peripheral effect.

10. The motion picture or television theater of claim 6, wherein each of said chairs includes, a seat with arm rests and having a back which terminates into a hood over each chair, support means for each chair including pivot means associated therewith for rocking the chair in the forwardly-backwardly or transverse direction, means for actuating said pivot means, means for vibrating said chair, odor producing means associated with each chair, odor conducting conduits associated with said odor producing means, means for moving air through said odor producing means and said odor conduits towards the face of a spectator seated in said chair, air passageways associated with said chair having exit ports for directing air towards various portions of the spectator's body, means for feeding air to the air passageways, exhaust means associated with the hood of said chair for removing said fed air and odors, and a loudspeaker associated with the hood of each chair.

References Cited

UNITED STATES PATENTS

| | | | |
|---|---|---|---|
| 1,749,187 | 3/1930 | Leavell. | |
| 1,789,680 | 1/1931 | Gwinnett | 272—18 |
| 2,273,074 | 2/1942 | Waller | 350—129 |
| 2,280,206 | 4/1942 | Waller | 352—36 |
| 2,406,574 | 8/1946 | Waller | 273—105.1 |
| 2,540,144 | 2/1951 | Stern. | |
| 2,562,959 | 8/1951 | Stern | 272—9 X |
| 2,562,960 | 8/1951 | Stern | 272—9 X |
| 2,813,452 | 11/1957 | Laube | 272—9 X |
| 2,861,806 | 11/1958 | Disney | 352—36 X |
| 2,883,763 | 4/1959 | Schaper | 35—12 |
| 3,114,979 | 12/1963 | Fox | 35—12 |

FOREIGN PATENTS

| | | |
|---|---|---|
| 1,004,971 | 12/1951 | France. |
| 1,273,969 | 9/1961 | France. |

ANTON O. OECHSLE, Primary Examiner

M. R. PAGE, Assistant Examiner

U.S. Cl. X.R.

52—8; 272—18; 352—36, 125, 129